US012605946B2

(12) United States Patent
Ward

(10) Patent No.: US 12,605,946 B2
(45) Date of Patent: Apr. 21, 2026

(54) DIGITAL FLATBED CUTTERS

(71) Applicant: Vivid Laminating Technologies Ltd, Ashby de la Zouch (GB)

(72) Inventor: Gavin Ward, Ashby de la Zouch (GB)

(73) Assignee: Vivid Laminating Technologies Ltd, Ashby de la Zouch (GB)

( * ) Notice: Subject to any disclaimer, the term of this patent is extended or adjusted under 35 U.S.C. 154(b) by 193 days.

(21) Appl. No.: 18/583,193

(22) Filed: Feb. 21, 2024

(65) Prior Publication Data

US 2024/0316960 A1 Sep. 26, 2024

(30) Foreign Application Priority Data

Mar. 23, 2023 (GB) .................................... 2304230

(51) Int. Cl.

*B41J 11/66* (2006.01)
*B41J 2/21* (2006.01)
*B41J 11/00* (2006.01)

(52) U.S. Cl.

CPC ............ *B41J 11/663* (2013.01); *B41J 2/2114* (2013.01); *B41J 11/00214* (2021.01); *B41J 11/00218* (2021.01); *B41J 11/007* (2013.01)

(58) Field of Classification Search

CPC ... B41J 11/663; B41J 2/2114; B41J 11/00214; B41J 11/00218; B41J 11/007; B41J 3/44; B41J 11/0015; B41J 3/28; B41J 11/70; B41J 13/12; B41J 29/393; B41J 11/66; B26D 7/018; B26D 3/08; B26D 5/007; B26D 5/32; B26D 5/34; B26D 7/27; B26D 7/2628; B26F 1/3813; B41F 16/0033; B41F 19/001; B41F 19/005; B41F 19/007; B41F 19/008; B41F 23/08; B41F 33/0081;

(Continued)

(56) References Cited

U.S. PATENT DOCUMENTS

2021/0101338 A1* 4/2021 Kainan ................. B29C 64/245
2022/0227090 A1* 7/2022 Ward ...................... B31B 50/20
2023/0069955 A1 3/2023 Takahashi et al.

FOREIGN PATENT DOCUMENTS

CN 209426383 U 9/2019
JP 2017052137 A 3/2017

(Continued)

OTHER PUBLICATIONS

EPO, Extended European Search Report for corresponding European Patent Application No. 24155868.3, mailed Jul. 23, 2024, 10 pages.

(Continued)

*Primary Examiner* — Bradley W Thies
(74) *Attorney, Agent, or Firm* — NK Patent Law

(57) ABSTRACT

A digital flatbed cutter is described. The cutter includes a flatbed on which a printed workpiece can be positioned. A head unit is movable laterally along an x-axis direction and a perpendicular y-axis direction in a parallel plane above the flatbed. The head unit includes a cutter head and a printer head. The printer head includes at least one printhead for overprinting at least part of the printed workpiece with a UV-curable ink or other coating material to provide a raised printing finish, for example. The printer head also include a UV exposure unit configured to expose the applied UV-curable ink or coating material to UV light to cure it.

13 Claims, 10 Drawing Sheets

(58) Field of Classification Search
CPC ...... B41M 7/0045; B31F 1/07; B65D 5/0236; B65D 5/42
See application file for complete search history.

(56) References Cited

FOREIGN PATENT DOCUMENTS

| | | | |
|---|---|---|---|
| JP | 2022001422 | A | 1/2022 |
| KR | 101844334 | B1 | 4/2018 |

OTHER PUBLICATIONS

IPO, Combined Search and Examination Report for corresponding United Kingdom Patent Application No. GB2304230.2, dated Sep. 14, 2023, 6 pages.

* cited by examiner

DIGITAL FLATBED CUTTERS

CROSS-REFERENCE TO RELATED APPLICATIONS

This application claims priority to United Kingdom Patent Application No. 2304230.2, filed on Mar. 23, 2023, the entire content of which is incorporated by reference herein.

TECHNICAL FIELD

The invention relates to digital flatbed cutters, and in particular to cutters that can be used to cut, and optionally crease, a workpiece. The workpiece can comprise a sheet of material such as card or paper stock, for example.

BACKGROUND OF THE INVENTION

Raised printing is a known print finish process that can be applied to a workpiece, typically after a base image or design has been printed on a surface of the workpiece. The base image or design can be printed on the workpiece using any conventional printing process, e.g., using an inkjet or laser printer.

Raised printing normally involves printing a high-gloss, transparent, coating material over specific parts of the base image or design. The coating material is then dried or cured (e.g., by exposing it to ultraviolet (UV) light) to provide a raised surface texture to the printed workpiece. Such a print finish process is provided by the DuSense "sensory coater" supplied by Duplo International Ltd. This uses an inkjet printer to print transparent coating material on a workpiece surface to provide a raised finish that resembles embossing. Texturing can be controlled by height mapping in the artwork files. Such printing machines are extremely expensive and typically have one or more fixed printheads arranged in a row that overprint the coating material on to the printed surface of the workpiece as it moves past.

The workpiece will often need to be cut after the coating material has been applied. For example, a repeating pattern or array of base images or designs might be printed on the workpiece surface and after the coating material has been applied to a specific part of each base image or design, the workpiece will need to be cut so that the sheet of material is divided into several smaller pieces where each piece includes one of the base images or designs. The smaller pieces can be business cards or postcards, for example, that are cut from a larger sheet of printed material and can include the same base image or design. Alternatively, the base images or designs can be different.

Typically, the overprinted workpieces are stacked on top of each other and the stack is cut into the smaller pieces using a guillotine. But it has been found that when a coating material has been applied to the workpieces, using a guillotine can crush the coating material, which impairs the quality of the raised finish. The stack of workpieces often bends or domes as the sheets are cut by the guillotine which can result in an uneven cut. Since using raised printing significantly increases the overall production cost, and should result in a premium product, any impairment of the finish should be avoided if possible.

In a known "toner foiling" process, a pattern of toner is applied to the surface of a workpiece by a suitable process such as a laser printing. A transfer material is then adhered to the toner to create a decorative effect. The transfer material is normally a multi-layer material that is releasably adhered to a backing material. The transfer material may include an adhesive layer that allows it to adhere to the toner, and metallised or pigmented layer. The transfer material may be adhered to the toner using a heated roller, for example. Applying heat causes the toner to become tacky. Any transfer material that contacts the toner becomes adhered to it and may be released or peeled away from the backing material. Any transfer material that contacts the part of the workpiece to which toner has not been applied remains adhered to the backing material. It will therefore be understood that the transfer material is applied to the surface of the workpiece in a pattern that matches the pattern of the toner.

Rolls and sheets of transfer material and the adhered backing material are sold commercially as "foils" and are available in a wide variety of colours and metallised effects.

Digital flatbed cutters are known. In a typical cutter of this type, a workpiece such as a sheet of card or paper stock is placed on a flatbed. An example of a digital flatbed cutter is the VELOBLADE® product supplied by Vivid Laminating Technologies Ltd of Matrix House, Norman Court, Ivanhoe Business Park, Ashby de la Zouch, Leicestershire, LE65 2UZ, United Kingdom.

The flatbed can be the upper part of a conveyor belt, for example. A sheet-feed can hold a stack of workpieces at one end of the conveyor belt, and the conveyor belt can move each workpiece in turn from the sheet-feed to a working position where it is worked by the cutter, e.g., where it is cut and creased, and where a strip of tape might optionally be applied to it. Each workpiece is then moved by the conveyor belt to a collection tray. Each workpiece can already be printed with one or more base images or designs and one or more registration marks.

The digital flatbed cutter normally includes a head unit that is mounted above the flatbed on an assembly that can move the head unit in a controlled way in a parallel plane above the flatbed (i.e., in a plane defined by an x-axis and a perpendicular y-axis). The head unit can move in a first direction (i.e., a y-axis direction) along a support rail that extends over the flatbed. The support rail itself can move in a second direction (i.e., an x-axis direction) along side rails that are located at the sides of the flatbed, for example. The conveyor belt is normally configured to move the workpiece in the x-axis direction.

The head unit can include a cutter head with a knife or blade for cutting the workpiece. The knife or blade can typically move vertically relative to the flatbed (i.e., along a z-axis direction that is perpendicular to both the x- and y-axes directions). In particular, the knife or blade can be moved between a first position where it is spaced apart from the workpiece and a second position where it is in contact with the workpiece for cutting. A creaser head can also be mounted on the head unit. The creaser head can include a creaser wheel for creasing the workpiece. The creaser wheel can typically move along the z-axis direction. In particular, the creaser wheel can be moved between a first position where it is spaced apart from the workpiece and a second position where it is in contact with the workpiece for creasing.

Some digital flatbed cutters can include a tape applicator head mounted to the head unit. An example of a tape applicator head is the VELOTAPER® product supplied by Vivid Laminating Technologies Ltd for use with the VELOBLADE® product. The tape applicator head can include an applicator roller for applying one or more strips of tape (e.g., double-sided tape) to the workpiece.

The head unit can be aligned precisely with the workpiece before it is worked. For example, the head unit can include a camera and use optical recognition of the one or more printed registration marks on the workpiece or the outline of the workpiece on the flatbed. Once the head unit has been precisely aligned relative to the workpiece positioned on the flatbed, the workpiece can be cut, creased and tape can be applied, in any order by moving the head unit and operating the relevant tool head in turn. The cutting, creasing and tape application can be based on information stored in a digital file that is used to control the operation of the digital flatbed cutter. In particular, the digital file can include cutting information, creasing information, and tape application information. The respective information can include information for controlling the movement of the head unit when the respective tool head is being used to work the workpiece, and information for controlling the respective tool head, for example to raise or lower the knife or blade of the cutter head or the creaser wheel of the creaser head, or to control the operation of the tape applicator head.

SUMMARY OF THE INVENTION

The present invention provides a digital flatbed cutter A digital flatbed cutter comprising:

a flatbed on which a printed workpiece can be positioned;

a head unit that is movable laterally along an x-axis direction and a perpendicular y-axis direction in a parallel plane above the flatbed;

a cutter head mounted to the head unit and including a knife or blade for cutting the workpiece, the knife or blade being movable along a z-axis direction that is normal to the plane and perpendicular to the x- and y-axes;

a printer head mounted to the head unit and including at least one printhead configured to apply a UV-curable ink or coating material to the workpiece; and a control unit configured to control the movement of the head unit using a digital file with cutting information which specifies where the workpiece should be cut by the knife or blade of the cutter head, and overprinting information which specifies where the workpiece should be overprinted with UV-curable ink or coating material by the printhead of the printer head;

wherein the printer head further comprises a UV exposure unit configured to expose the applied UV-curable ink or coating material to UV light to cure it.

The flatbed can be a conveyor belt. The conveyor belt can be configured to move the workpiece along the x-axis direction.

The head unit can be mounted on a support rail that extends over the flatbed. The head unit can be moved along the support rail (i.e., along the y-axis direction) by an actuator. The support rail can be mounted on one or more side rails. The support rail can be moved along the one or more side rails (i.e., along the x-axis direction) by one or more actuators. The side rails can be located at opposite sides of the flatbed, for example, and are arranged substantially perpendicular to the support rail. The support rail and side rails allow the head unit to be moved in any direction under precise control in one or both of the x- and y-axes—i.e., in the parallel plane above the flatbed. It will be understood that other ways of moving the head unit under precise control can also be used.

Each printhead can be of any suitable type, e.g., an inkjet type. Each printhead is configured to apply a suitable UV-curable ink or coating material to the workpiece for overprinting. The UV-curable ink or coating material can be a high-gloss, transparent ink or coating material that is suitable for overprinting a base image or design that is already printed on the workpiece so as to provide a raised printing finish. Before being overprinted, the workpiece can be printed with one or more base images or designs. The one or more base images or designs can be printed on the workpiece using any conventional printing process, e.g., using an inkjet or laser printer. The workpiece can be printed with a repeating pattern or array of base images or designs so that the workpiece can be cut by the cutter head of the digital flatbed cutter in to several smaller pieces such as business cards or postcards, for example, where each smaller piece includes one of the base images or designs with selective overprinting. The workpiece can also be printed with one or more base images or designs so that the workpiece can be cut by the cutter head of the digital flatbed cutter to form one or more packaging blanks, for example, where each base image or design with selective overprinting forms the printed outer surface of an assembled container. After being cut from the workpiece, each packaging blank can be assembled to form a respective container. If the applied UV-curable ink or coating material is transparent (or is substantially transparent or translucent) the underlying base image or design is visible through the ink or coating material. Each printhead can be connected to an ink supply with one or more replaceable ink cartridges. The printer head of the digital flatbed cutter can be controlled by the control unit using the digital file so that the one or more printheads selectively overprint the workpiece as the head unit is moved over the workpiece. At least each printhead (and optionally the printer head as a whole) can be movable along the z-axis if it is necessary to position each printhead at an optimum distance from the workpiece surface. This allows different thicknesses of workpiece to be accommodated.

The printer head comprises an UV exposure unit that exposes the UV-curable ink or coating material to UV light after it has been applied to the workpiece surface. The UV exposure unit can be positioned adjacent the at least one printhead. The UV exposure unit can be adjustable so that the intensity of the UV light can be varied to control the curing, e.g., the degree or speed of curing.

The UV-curable ink or coating material can be applied to the workpiece when the head unit is moving along the y-axis direction, but optionally not moved along the x-axis direction. The head unit can be moved across the workpiece in one or more passes with the head unit being moved along the x-axis between passes and when the ink or coating material is not being applied to the workpiece. Alternatively, the ink or coating material can be applied to the workpiece when the head unit is moving along the x-axis direction, but optionally not moved along the y-axis direction. The head unit can be moved across the workpiece in one or more passes with the head unit being moved along the y-axis between passes and when the ink or coating material is not being applied to the workpiece.

It will be understood that in practice it is likely that only part of the workpiece will be overprinted by the printer head—i.e., that part of each base image or design where the raised printing finish is required.

In some arrangements, the thickness of the applied UV-curable ink or coating material can be adjusted during the overprinting process by controlling the at least one printhead. The workpiece can also be overprinted two or more times—i.e., where the ink or coating material in a second or subsequent overprinting process is applied to an existing layer of ink or coating material. In this case, the overprinting information can specify where the workpiece should be overprinted for each individual overprinting process. This allows raised printing with different thicknesses (e.g., a contoured surface) to create different textured effects or texturing.

The digital flatbed cutter of the present invention allows a printed workpiece to be overprinted and cut using a single piece of equipment and avoids the problems that are known to arise when a stack of workpieces with raised printing is cut into several smaller pieces using a guillotine. If the cut workpiece is a packaging blank that can be assembled to form a container, for example, the digital flatbed cutter can include a tape applicator head—see below—which provides further efficiency savings because it avoids the need to pass the packaging blank through a separate tape applicator or to apply strips of tape manually.

The printer head can be mounted to the head unit next to the cutter head.

The knife or blade of the cutter head can be mounted to be moved by an actuator between a first position where it is spaced apart from the workpiece and a second position where it is in contact with the workpiece for cutting.

The head unit can further include a transfer material applicator head with an applicator roller for applying transfer material to the workpiece, and more particularly on top of a layer of UV-curable ink or coating material applied by the printer head. The transfer material applicator head can be mounted to the head unit next to the cutter head and the printer head. In some arrangements, the transfer material applicator head can be integrated into the printer head. The digital flatbed cutter can be used to apply a pattern of UV-curable ink or coating material to the surface of the workpiece, and transfer material can then be adhered to the ink or coating material by the transfer material applicator head to define a matching pattern of transfer material. The UV-curable ink or coating material can optionally be only partially cured by the UV exposure unit but left tacky so that the transfer material adheres to it. In this way, the partially cured UV-curable ink or coating material is being used as an adhesive to stick the transfer material to the workpiece surface. The partial curing can be achieved by varying the intensity of the UV light emitted by the UV exposure unit or by reducing the time for which the applied ink or coating material is exposed to the UV light (or "exposure time"), for example. In contrast to the known "toner foiling" process described above, the transfer material is typically adhered to the partially cured ink or coating material without the need to heat the underlying adhesive layer, and the applicator roller of the transfer material applicator head does not need to be heated.

There is an obvious advantage in using the same UV-curable ink or coating material for overprinting that is designed to provide a raised printing finish or effect—e.g., where the UV-curable ink or coating material is preferably transparent—and overprinting that is designed for adhering transfer material to create a finish effect that is similar to the known "toner foiling". However, it will be understood that the UV-curable ink or coating material does not necessarily need to be transparent if it is going to be covered by the transfer material. Using the same transparent UV-curable ink or coating material allows both types of overprinting to be carried out without changing the ink or coating material. Changing the ink or coating material may not be practical without cleaning the at least one printhead, for example, and would take time. Part of the workpiece can be overprinted with transparent UV-curable ink or coating material to provide a raised printing finish or effect and another part of the workpiece can be overprinted with UV-curable ink or coating material to adhere transfer material. The overprinting can be carried out as two separate processes using the same transparent UV-curable ink or coating material: for example, a first overprinting process where the UV-curable ink or coating material is applied to the workpiece in one or more passes and fully cured, and a second overprinting process where the UV-curable ink or coating material is only partially cured and where the transfer material applicator head is used to adhere transfer material, or vice versa. The overprinting for both finish effects might also by carried out as a single process: for example, an overprinting process where the UV-curable ink or coating material is applied to the workpiece in one or more passes, and where the UV exposure unit is controlled during the overprinting process to only partially cure the UV-curable ink or coating material to which the transfer material is to be subsequently applied, and where the transfer material applicator head is controlled to selectively apply the transfer material to the partially cured ink or coating material. In other words, UV-curable ink or coating material that is applied to the parts of the workpiece that require raised printing will be fully cured and UV-curable ink or coating material that is applied to the parts of the workpiece that require transfer material will be only partially cured so that it remains tacky. This may require the curing to be controlled or adjusted during the overprinting process, and it may be more straight-forward to carry out the overprinting process separately where the curing can be the same for the duration of each overprinting process. Transfer material will not adhere to the fully cured ink or coating material because it is not tacky. If the digital flatbed cutter of the present invention includes a transfer material applicator head, it allows a printed workpiece to be overprinted and finished using a single piece of equipment. In another arrangement both transparent and non-transparent UV-curable ink or coating material may be applied separately using the same or different printheads. For example, the print head may have a first printhead configured to apply a transparent UV-curable ink or coating material to the workpiece for raised printing finishes and a second printhead configured to apply a non-transparent UV-curable ink or coating material to the workpiece for adhering a transfer material.

The transfer material can be releasable from a backing material and the step of adhering the transfer material to the UV-curable ink or coating material will typically comprise releasing the adhered transfer material from the backing material. Any transfer material that is not adhered to the ink or coating material will remain adhered to the backing material and is removed with it. The transfer material can be a conventional "foil" and can include an adhesive layer and a metallised or pigmented layer, for example. The transfer material/backing material can be applied from a roll and the waste backing material and any remaining transfer material can be gathered on a waste roll. The transfer material applicator head can include a first support for supporting the roll of transfer material/backing material and a second support for supporting the waste roll. It can also include one or more guide rollers for guiding the transfer material/backing material from the roll to the applicator head and for guiding the backing material to the waste roll.

The applicator roller of the transfer material applicator head is rotatable about a longitudinal axis of the applicator roller that is parallel with the plane and it will be understood that the applicator roller will rotate about this longitudinal axis when the transfer material is being applied to the workpiece. The longitudinal axis of the applicator roller can be aligned with the x-axis direction so that the head unit is moved along the y-axis direction when the transfer material is applied or vice versa.

At least the applicator roller of the transfer material applicator head can move along the z-axis direction so that it can move into contact with the applied UV-curable ink or coating material. In other words, at least the applicator roller can be mounted to be moved by an actuator between a first position where it is spaced apart from the workpiece and any layers of ink or coating material, and a second position where it is in contact with the applied UV-curable ink or coating material for adhering the transfer material.

The head unit can further include a creaser head with a creaser wheel for creasing the workpiece. The creaser head can be mounted to the head unit next to the cutter head and the printer head. The creaser wheel can move along the z-axis direction so that it can move into contact with the workpiece. In particular, the creaser wheel can be mounted to be moved by an actuator between a first position where it is spaced apart from the workpiece and a second position where it is in contact with the workpiece for creasing.

The head unit can further include a tape applicator head with an applicator roller for applying a strip of tape to the workpiece. The tape applicator head can be mounted to the head unit next to the cutter head and the printer head (and the optional transfer material applicator and creaser heads). At least the applicator roller of the tape applicator head is preferably mounted to be rotatable about the z-axis. The applicator roller of the tape applicator head is also rotatable about a longitudinal axis of the applicator roller that is parallel with the plane and it will be understood that the applicator roller will rotate about this longitudinal axis when the tape is being applied to the workpiece. When a strip of tape is being applied to the workpiece, at least the applicator roller of the tape applicator head is preferably rotated about the z-axis so as to be aligned with a particular direction, and the head unit is then moved in that direction over the flatbed with the applicator roller in contact with the workpiece.

The tape applicator head is generally similar to the tape applicator head described above and can further include a support for supporting a tape roll and one or more guide rollers for guiding the tape from the tape roll to its applicator roller. Each guide roller can be a single roller or a pair of counter-rotating rollers, for example. The tape roll can be supported so as to be freely rotatable when tape is being removed and applied to the workpiece. For example, the support can include a rotatable hub that is sized and shaped to be received in an opening in the tape roll. Each roller can be a driven roller—i.e., which is driven to rotate by an actuator—or a non-driven roller—i.e., which is freely rotatable by the movement of the tape. The tape applicator head can include other stationary guides. The support for the tape roll can be positioned above the applicator roller and any other guide rollers or stationary guides.

The tape applicator head can further include a knife or blade for cutting the tape. The tape applicator head can be controlled to apply a strip of tape of a particular length to the workpiece where the starting point of the tape strip is determined by positioning the tape applicator head over the workpiece, the direction or orientation of the tape strip is determined by the subsequent movement of the tape applicator head, and the length of the tape strip is determined by cutting the tape. The applicator roller of the tape applicator head can be raised away from the workpiece surface before the tape strip is cut.

The whole of the tape applicator head can rotate relative to the head unit, including the support for supporting the tape roll. Alternatively, the support can be fixed, and at least the applicator roller of the tape applicator head can rotate relative to the head unit if the one or more guide rollers can accommodate the relative rotation between the applicator roller and the tape roll. Such relative rotation might be limited to about 180° in some arrangements.

The tape applicator head can be used to apply any suitable tape to the workpiece, including double-sided adhesive tape, silicone tape etc. In the case of double-sided adhesive tape, the tape will normally be applied to the workpiece with the backing layer still adhered; which backing layer is then subsequently removed by hand to expose the underlying adhesive. Leaving the backing layer on the tape allows for stacking. But it is also possible for the backing layer to be removed by the tape applicator head when the tape is applied to the workpiece.

At least the applicator roller of the tape applicator head can move along the z-axis direction so that it can move into contact with the workpiece. In other words, at least the applicator roller of the tape applicator head can be mounted to be moved by an actuator between a first position where it is spaced apart from the workpiece and a second position where it is in contact with the workpiece for applying a strip of tape, and optionally where contact pressure is applied to the workpiece by the applicator roller.

The control unit is preferably configured to control the operation of the cutter head, the printer head, and the optional transfer material applicator, creaser and tape applicator heads. The digital file can further comprise transfer material application information which specifies where the transfer material should be applied using the applicator roller of the transfer material applicator head, creasing information which specifies where the workpiece should be creased by the creaser wheel of the creaser head and tape application information which specifies where each tape strip should be applied to the workpiece. The transfer material application information may be associated with the overprinting information—for example, to create a finish effect that is similar to the known "toner foiling" effect, the overprinting information can be used to control the printer head to apply a pattern of UV-curable ink or coating material to the relevant parts of the workpiece, and to control the transfer material applicator head to adhere transfer material to the UV-curable ink or coating material to form a matching pattern of transfer material. The overprinting information and transfer material application information may be different if the transfer material is to be applied to only part of the UV-curable ink or coating material—i.e., if the workpiece is intended to have both a raised printing effect and a "toner foiling" effect with applied transfer material. In practice, transfer material application information may be basic and may simply involve raising or lowering the applicator roller of the transfer material applicator head. This is because transfer material will only adhere to the partially-cured ink or coating material that remains slightly tacky—it will not adhere to either the workpiece surface or any ink or coating material that is fully cured. Any transfer material that is not released from the backing material is taken up as waste.

Each work process is preferably carried out in turn with the head unit being positioned and moved as required. The work processes can be carried out in any suitable order. Each work process can be split into several sub-processes. The cutting and overprinting—and the optional transfer material application, creasing and tape application—is based on information stored in the digital file. The respective information can include information for controlling the movement of the head unit when the respective tool head is being used to work the workpiece, and information for controlling the respective tool head, for example to raise or lower the knife or blade of the cutter head, to control the operation of each printhead to selectively apply the UV-curable ink or coating material to those parts of the workpiece surface that require overprinting, to control or adjust the UV exposure unit, or to control the applicator roller of the transfer material applicator head.

The present invention further provides a method of using the digital flatbed cutter described above to overprint a printed workpiece with UV-curable ink or coating material, and cut the workpiece. The workpiece may be cut after the overprinting. The workpiece can also be creased and/or a strip of tape can be applied to it. The digital flatbed cutter can be used to apply a pattern of UV-curable ink or coating material to the surface of the workpiece (i.e., overprint the workpiece), and adhere transfer material to the ink or coating material to define a matching pattern of transfer material.

In use, a workpiece is positioned on the flatbed. The head unit is precisely aligned with the workpiece on the flatbed. For example, the head unit can include a camera or other optical device and the control unit can use optical recognition of one or more printed registration marks on the workpiece or the outline of the workpiece. The optical recognition allows the control unit to know the precise position and orientation of the workpiece on the flatbed and to precisely align the head unit with the workpiece. Once the head unit has been precisely aligned, the workpiece can be worked, i.e., one or more of the following work processes can be carried out in any order:

- cutting: the workpiece can be cut by the cutter head,
- overprinting: at least part of the workpiece can be overprinted by applying an ink or coating material, e.g., a high-gloss transparent UV-curable ink or coating material, to the workpiece using the printer head,
- applying transfer material: transfer material can be adhered to the ink or coating material using the optional transfer material applicator head,
- creasing: the workpiece can be creased by the optional creaser head, and
- taping: one or more strips of tape can be applied to the workpiece by the optional tape applicator head.

BRIEF DESCRIPTION OF DRAWINGS

As shown in FIGS. 1 and 2, a digital flatbed cutter 1 includes a flatbed 2 on which a printed workpiece W can be positioned.

A head unit 4 is mounted above the flatbed 2. The head unit 4 is mounted on a support rail 6 and can move from side-to-side along the support rail (i.e., along a y-axis direction) by a suitable actuator (not shown). The support rail 6 is mounted on side rails (not shown) and can move backwards and forwards along the side rails (i.e., along an x-axis direction) by one or more suitable actuators (not shown). The actuators are controlled by a control unit (not shown) which can include a suitable processor and a user input device such as a touch display screen or keypad, for example. By controlling the actuators, the head unit 4 can be positioned precisely and can be moved in any direction in a parallel plane above the flatbed 2 defined by the perpendicular x- and y-axes.

Figure 1:
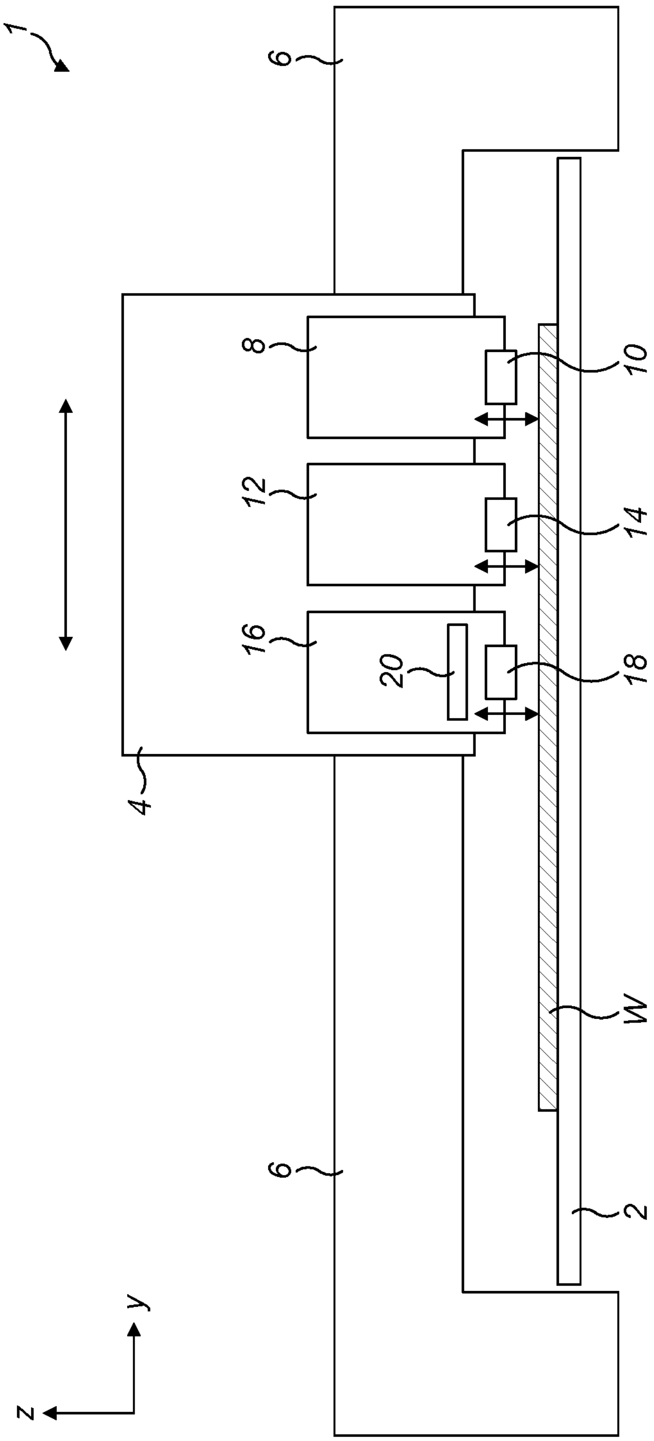
FIG. 1 is a schematic front view of a digital flatbed cutter according to the present invention.
Figure 2:
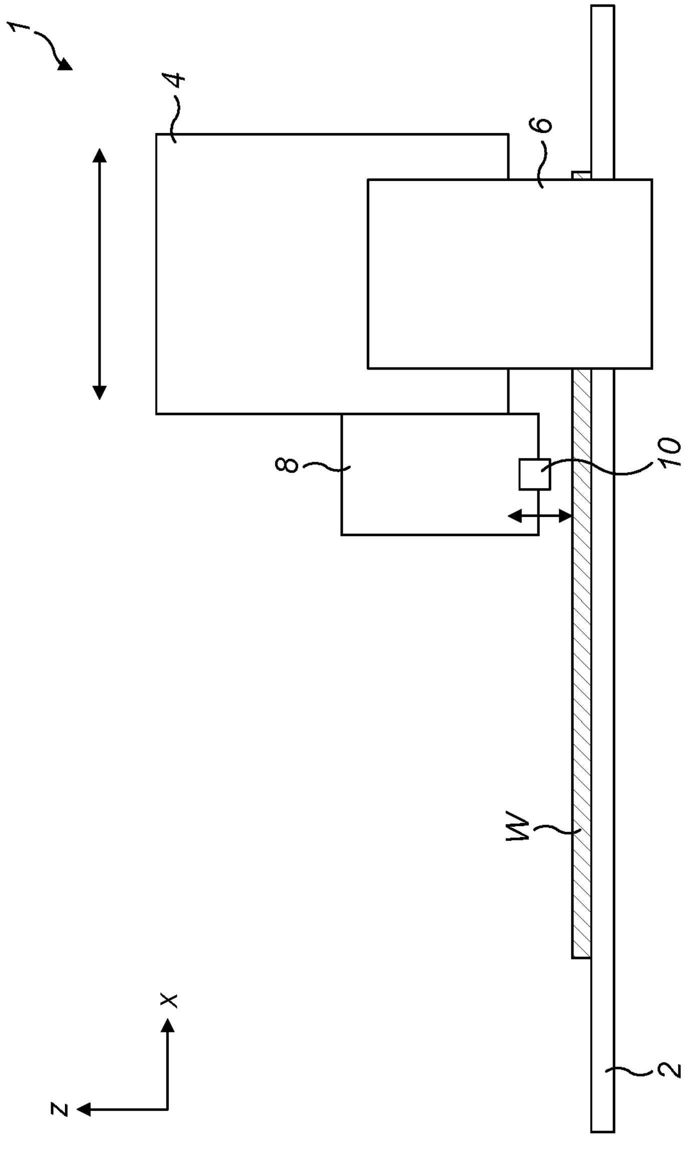
FIG. 2 is a schematic side view of the digital flatbed cutter of FIG. 1.

The head unit 4 includes a cutter head 8 with a knife or blade 10 and a creaser head 12 with a creaser wheel 14. The knife or blade 10 is mounted so that it can move along the axis that is normal to the plane (i.e., along the z-axis direction). The knife or blade 10 can be moved by an actuator between a first position-shown in FIGS. 1 and 2—where it is spaced apart from the workpiece W and a second position where it is in contact with the workpiece for cutting. The creaser wheel 14 is also mounted so that it can move along an axis that is normal to the plane (i.e., along the z-axis direction). The creaser wheel 14 can be moved by an actuator between a first position-shown in FIGS. 1 and 2—where it is spaced apart from the workpiece W and a second position where it is in contact with the workpiece for creasing.

The head unit 4 also includes a printer head 16 with an inkjet-type printhead 18 configured to apply a high-gloss, transparent, UV-curable ink or coating material, and an UV exposure unit 20. The ink or coating material is suitable for overprinting a base image or design that has already been printed on the workpiece so as to provide a raised printing finish. The printhead 18 is connected to an ink supply with one or more replaceable ink cartridges (not shown). At least the printhead 18 can be movable along the z-axis if it is necessary to position each printhead at an optimum distance from the workpiece surface. This allows different thicknesses of workpiece W to be accommodated, for example.

Although not shown, the head unit 4 can optionally also include a tape applicator head that can be used to apply one or more strips of tape to the workpiece W.

The cutter head 8, creaser head 12, printer head 16, and optional tape applicator head are conveniently referred to as "tool heads" and the knife or blade 10, creaser wheel 14, printhead 18 and the applicator roller of the optional tape applicator head as "tools". The operation of the tools-including their movement in the z-axis direction and, in the case of the printer head 16 the selective application of the UV-curable ink or coating material by the printhead 18—is controlled by the control unit (not shown). The control unit can position the head unit 4 over the workpiece W so that the appropriate tool head is at the required position. In the case of the cutter head 8, the creaser head 12, and the optional tape applicator head (not shown), the control unit can then move the tool down into contact with the workpiece W, move the head unit 4 with the tool is contact with the workpiece to cut, crease or apply tape, move the tool up and away from the workpiece, and reposition the head unit over the workpiece. This can be repeated multiple times until the respective process is complete, after which the next process is carried out or the processing of the workpiece is finished. If the tool is the applicator roller of the optional tape applicator head, it is rotated about the z-axis so that it is aligned with the direction in which the head unit 4 will be moved over the flatbed 2 (i.e., so that its longitudinal axis is substantially perpendicular to the movement direction of the head unit). In the case of the printer head 16, the control unit can optionally adjust the position of the printhead 18 so that it is at the optimum distance from the workpiece surface. The control unit then moves the head unit 4 in one or more passes over the stationary workpiece W to apply UV-curable ink or coating material to those parts of the workpiece where overprinting is needed. In each pass, the printer head 16 is moved along the y-axis direction—i.e., from side-to-side across the flatbed 2. Between each pass, the printer head 16 is moved along the x-axis direction. For example, during the overprinting process, the printer head 16 can be moved along the y-axis direction from a first edge of the workpiece W towards a second, opposite, edge of the workpiece while selectively applying a layer of UV-curable ink or coating material to those parts of the printed workpiece that need to be overprinted. The printer head 16 can then either be moved back to the first edge and moved a pre-determined distance along the x-axis direction, before being moved along the y-axis direction from the first edge towards the second edge, or moved a pre-determined distance along the x-axis direction, before being moved along the y-axis direction from the second edge towards the first edge. This is repeated until the overprinting of the workpiece W is complete. In the first case, the UV-curable ink or coating material is applied only when the printer head 16 is moved from the first edge towards the second edge in each pass. In the second case, the UV-curable ink or coating material is applied both when the printer head 16 is moved from the first edge towards the second edge and when the printer head is moved from the second edge towards the first edge. To reduce the number of passes needed for each overprinting process, the printer head 16 can include two or more printheads 18 arranged side-by-side in the x-axis direction so that more of the workpiece W can be overprinted in each pass. But it will be understood that this can increase the cost of the printer head. Alternatively, the printer head 16 is moved along the x-axis direction in each pass and is moved along the y-axis direction between passes. As described above, two or more overprinting process can be carried out sequentially to obtain contour effects or texturing. The applied UV-curable ink or coating material is cured by the UV exposure unit 20 after it has been applied to the workpiece surface (or to an existing layer of UV-curable ink or coating material). In the case where the UV-curable ink or coating material is only applied when the printer head 16 is moved from the first edge of the workpiece towards the second edge, the UV exposure unit 20 is preferably located on the trailing side of the printhead 18—see FIGS. 9 and 10, for example. The printer head 16 can include two or more UV exposure units if required.

The digital flatbed cutter 1 can include a feed mechanism (not shown) for positioning a workpiece on the flatbed 2. Any suitable feed mechanism can be used, e.g., a vacuum feed that can be integrated into the head unit 4 or the support rail 6 and which can be used to pick up an individual workpiece from a stack and position it on the flatbed 2.

The flatbed 2 can be a conveyor belt which can be used to support the workpiece W while it is being worked and move the workpiece to a collection tray.

The movement of the head unit 4 can be controlled by the control unit using a digital file.

Figure 3:
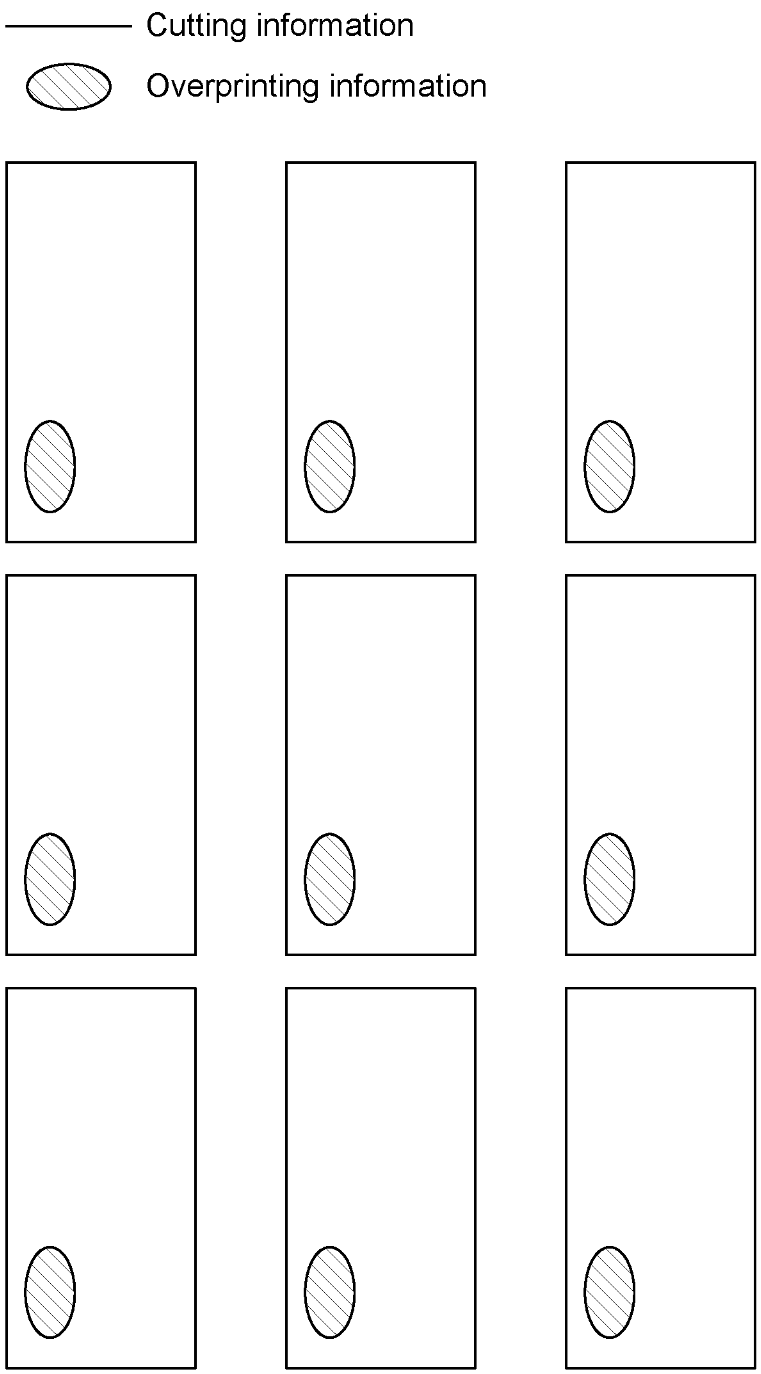
FIG. 3 is a visual representation of a first digital file for controlling the digital flatbed cutter according to the present invention.

A visual representation of the digital file for business cards is shown in FIG. 3 where cutting information is shown in solid line and overprinting information is shown as an oval-shaped area. In particular, the solid lines indicate where the workpiece W shown in FIG. 4 should be cut by the cutter head 8 to form the outer edges of the business cards, and the oval-shaped areas indicate where the workpiece should be overprinted by the transparent UV-curable ink or coating material to create a raised printing finish. It will be understood that the oval-shaped areas are only provided as a simple example, and that in practice the areas for overprinting can have any suitable shape and will normally be determined by the shape of the printed areas on the workpiece that are intended to be overprinted. The designated areas for overprinting the workpiece can be intricate and complex and are limited only by the print capabilities of the printhead 18 of the printer head 16.

Figure 4:
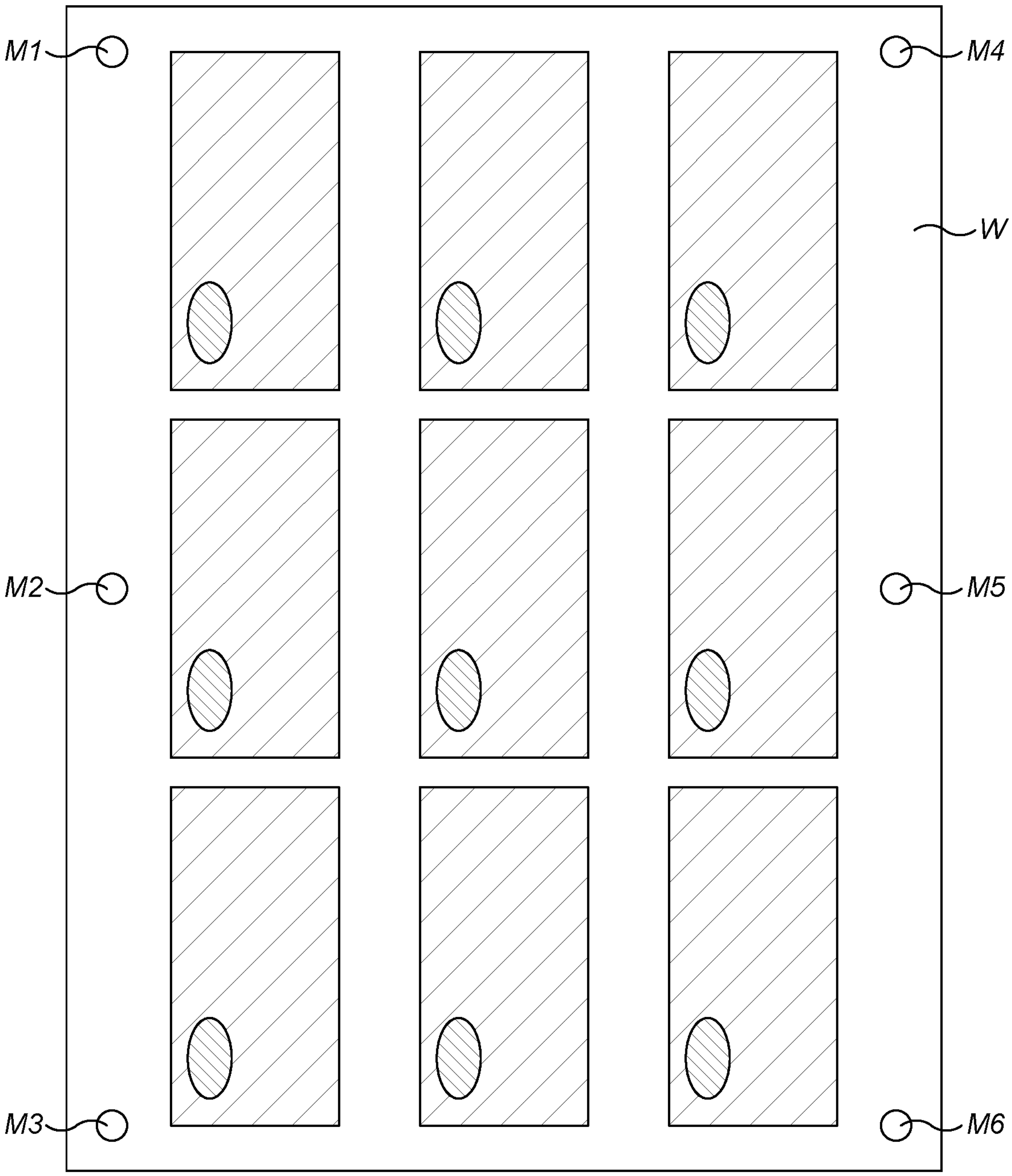
FIG. 4 is a top view of a first printed workpiece.

The workpiece W shown in FIG. 4 is a printed sheet of card stock. The workpiece W has printed areas that are indicated by the cross hatching. The printed areas (i.e., base images or designs) can be pre-printed on the workpiece by any suitable printing process such as inkjet printing or laser printing, for example. The oval-shaped printed areas are intended to be overprinted.

The workpiece W also includes six printed registration marks M1, M2, . . . , M6.

The workpiece W shown in FIG. 4 is positioned on the flatbed 2 using the feed mechanism (not shown). A stack of identical printed workpieces can be located at an end of the flatbed 2 and an individual workpiece can be picked from the stack and positioned on the flatbed. The head unit 4 is precisely aligned with the workpiece W. For example, the head unit 4 can include a camera (not shown) and the control unit can use optical recognition of the printed registration marks M1, M2, . . . , M6 to determine the precise position and orientation of the workpiece W on the flatbed 2. Once the head unit 4 has been precisely aligned relative to the workpiece W, the workpiece can be overprinted by the printer head 16 and cut by the cutter head 8 based on the respective information in the digital file. More particularly, the workpiece W can be overprinted by moving the head unit 4 over the workpiece in a series of passes as described above while the printer head 16 is controlled to selectively apply a layer of the UV-curable ink or coating material to the relevant parts of the workpiece—i.e., to the oval-shaped printed areas. (It will be understood that the oval-shaped areas of the digital file are in register with the oval-shaped printed areas on the workpiece W so that the oval-shaped printed areas shown in FIG. 4 are overprinted with the UV-curable ink or coating material.) The workpiece W is then cut by the cutter head 8 to produce separate business cards. The overprinting and cutting process are therefore carried out quickly and cost-effectively using the digital flatbed cutter and without the problems that occur when a guillotine is used to cut a stack of overprinted workpieces.

Figure 5A:
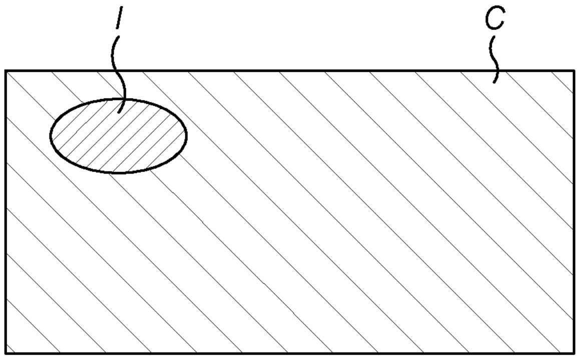
FIG. 5A is a top view of an overprinted business card produced from the first workpiece using the digital flatbed cutter according to the present invention.
Figure 5B:
FIG. 5B is a side view of the business card of FIG. 5A.

A single business card C is shown in FIGS. 5A and 5B and includes an area of overprinted UV-curable ink or coating material I that is applied over the oval-shaped printed area as a raised finish. The oval-shaped printed area of the business card C is visible through the UV-curable ink or coating material, which is transparent.

Figure 6:
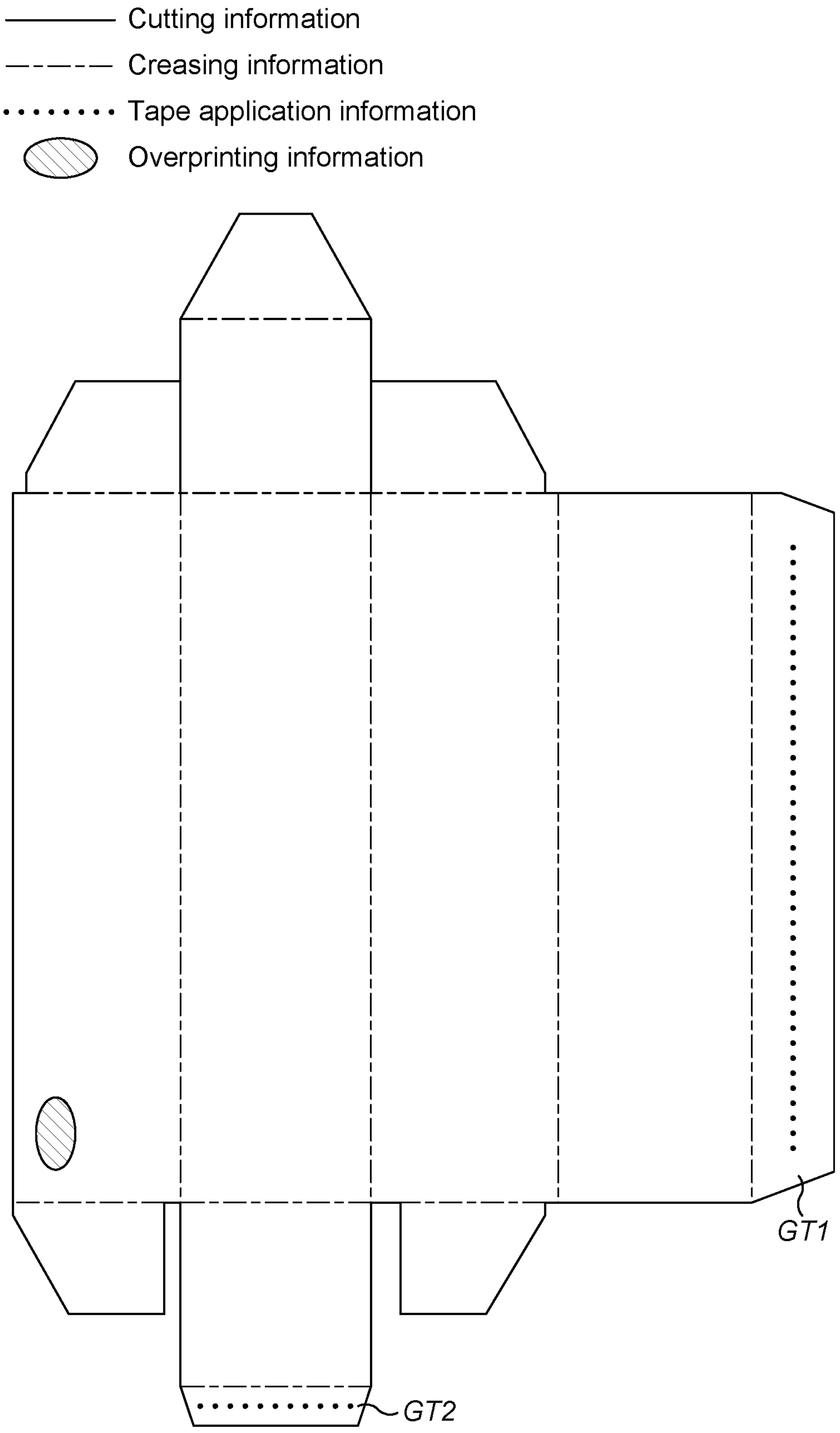
FIG. 6 is a visual representation of a second digital file for controlling the digital flatbed cutter according to the present invention.

A visual representation of the digital file for a packaging blank is shown in FIG. 6 where cutting information is shown in solid line, creasing information is shown in dashed line, tape application information is shown in dotted line, and overprinting information is shown as an oval-shaped area. In particular, the solid lines indicate where the workpiece W shown in FIG. 7 should be cut by the cutter head 8, the dashed lines indicate where the workpiece should be creased by the creasing head 14, the dotted lines indicate where a strip of tape of pre-determined width should be applied to the workpiece, and the oval-shaped area indicates where the workpiece should be overprinted by the transparent UV-curable ink or coating material to create a raised printing finish.

Figure 7:
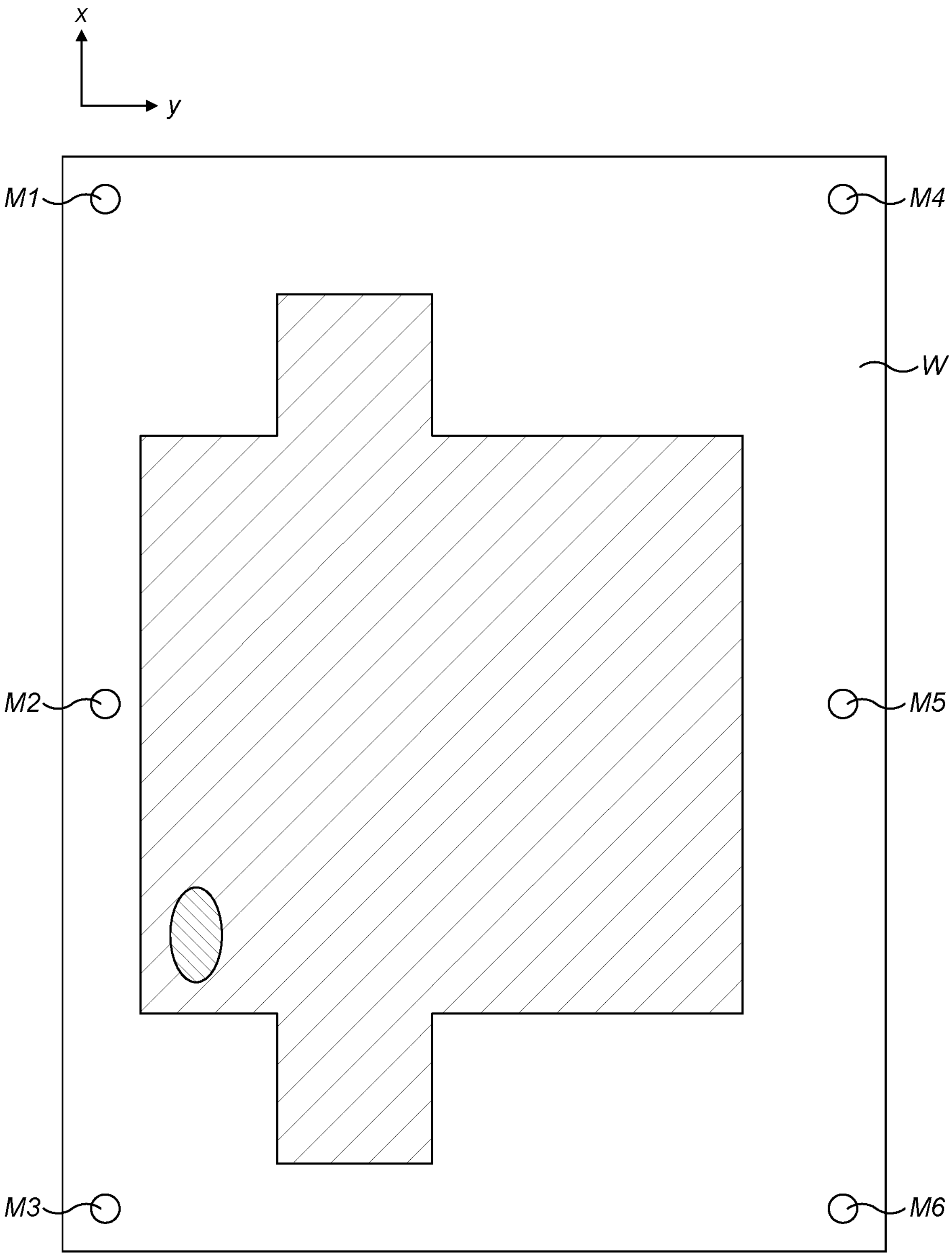
FIG. 7 is a top view of a second printed workpiece.

The workpiece W shown in FIG. 7 is a printed sheet of card stock. The workpiece W has printed areas that are indicated by the shading and which will be the outer surfaces of an assembled container. The printed areas (i.e., base image or design) can be pre-printed on the workpiece by any suitable printing process such as inkjet printing or laser printing, for example. The oval-shaped printed area is intended to be overprinted.

The workpiece W also includes six printed registration marks M1, M2, . . . , M6.

The workpiece W shown in FIG. 7 is positioned on the flatbed 2 using the feed mechanism (not shown). A stack of identical workpieces can be located at an end of the flatbed 2 and an individual workpiece can be picked from the stack and positioned on the flatbed. The head unit 4 is precisely aligned with the workpiece W. For example, the head unit 4 can include a camera (not shown) and the control unit can use optical recognition of the printed registration marks M1, M2, . . . , M6 to determine the precise position and orientation of the workpiece W on the flatbed 2. Once the head unit 4 has been precisely aligned relative to the workpiece, the workpiece can be overprinted by the printer head 16, cut by the cutter head 8, creased by the creaser head 12, and tape can be applied by the tape applicator head (not shown) based on the respective information in the digital file. The processes can be carried out in any suitable order.

The workpiece W can be overprinted by moving the head unit 4 over the workpiece in a series of one or more passes as described above while the printer head 16 is controlled to selectively apply a layer of the UV-curable ink or coating material to the relevant part of the workpiece.

In a tape application process, the head unit 4 can be positioned over a first glue tab GT1, the applicator roller (not shown) can be rotated about the z-axis to be aligned with the x-axis and moved down into contact with the workpiece, the head unit can be moved in the x-axis direction to apply a first tape strip S1 to the first glue tab GT1, the applicator roller can be moved up and away from the workpiece, the head unit can be re-positioned over a second glue tab GT2, the applicator roller can be rotated about the z-axis to be aligned with the y-axis and moved down into contact with the workpiece, the head unit can be moved in the y-axis direction to apply a second tape strip S1 to the second glue tab GT2, and the applicator roller can be moved up and away from the workpiece. (This assumes that the workpiece W has been positioned on the flatbed 2 such that its edges are exactly aligned with the x- and y-axes of the cutter. In practice, the edges of the workpiece W are likely to be mis-aligned with the x- and y-axes of the cutter such that the head unit 4 is moved along directions that are angled slightly with respect to the x-axis direction and the y-axis direction with the applicator roller (not shown) being rotated about the z-axis accordingly.) It will be understood that the applicator roller is not limited to applying tape strips that are aligned with the x-axis direction or the y-axis direction. In practice, the applicator roller can be rotated about the z-axis to be aligned with any direction in which the head unit 4 can be moved. For example, the applicator roller can be used to apply a diagonal tape strip that is not aligned with either the x-axis direction or the y-axis direction. In some arrangements, the applicator roller can be rotated about the z-axis while it is in contact with the workpiece and is applying tape if the movement direction of the head unit 4 changes.

Figure 8A:
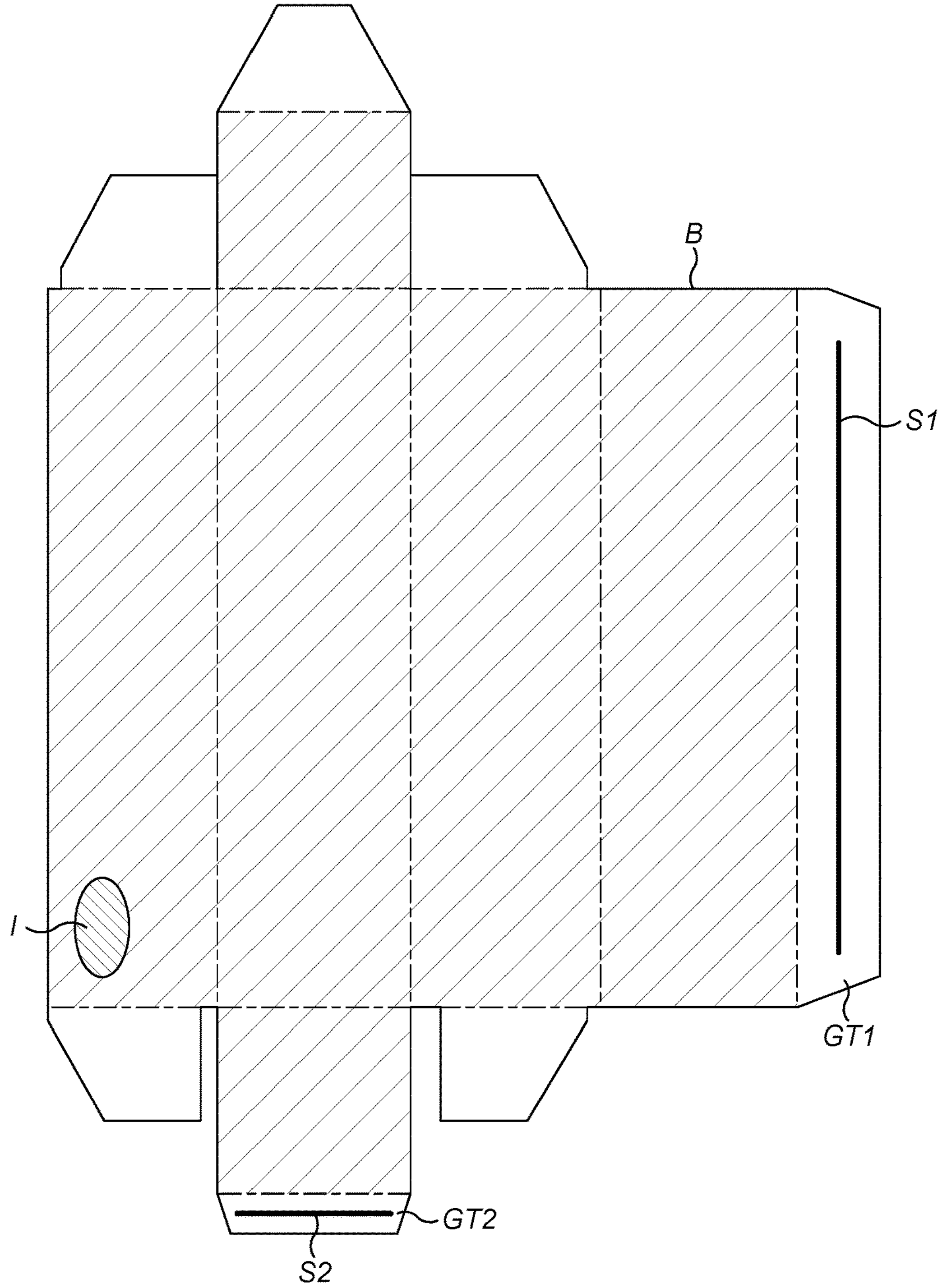
FIG. 8A is a top view of an overprinted packaging blank for a container produced from the second workpiece using the digital flatbed cutter according to the present invention.
Figure 8B:
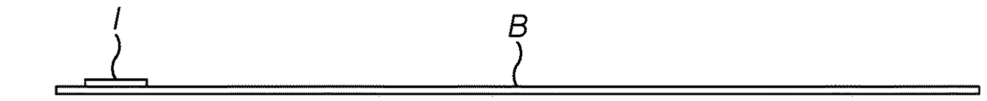
FIG. 8B is a side view of the packaging blank of FIG. 8A.

FIGS. 8A and 8B show a finished packaging blank B for a container with the tape strips S1 and S2 applied to the glue tabs GT1 and GT2. If the tape strips S1, S2 are double-sided tape, the backing layer can be removed to expose the adhesive and the packaging blank can be folded and assembled to form a container. The packaging blank B also includes an area of overprinted UV-curable ink or coating material I that is applied over the oval-shaped printed area as a raised finish.

Figure 9:
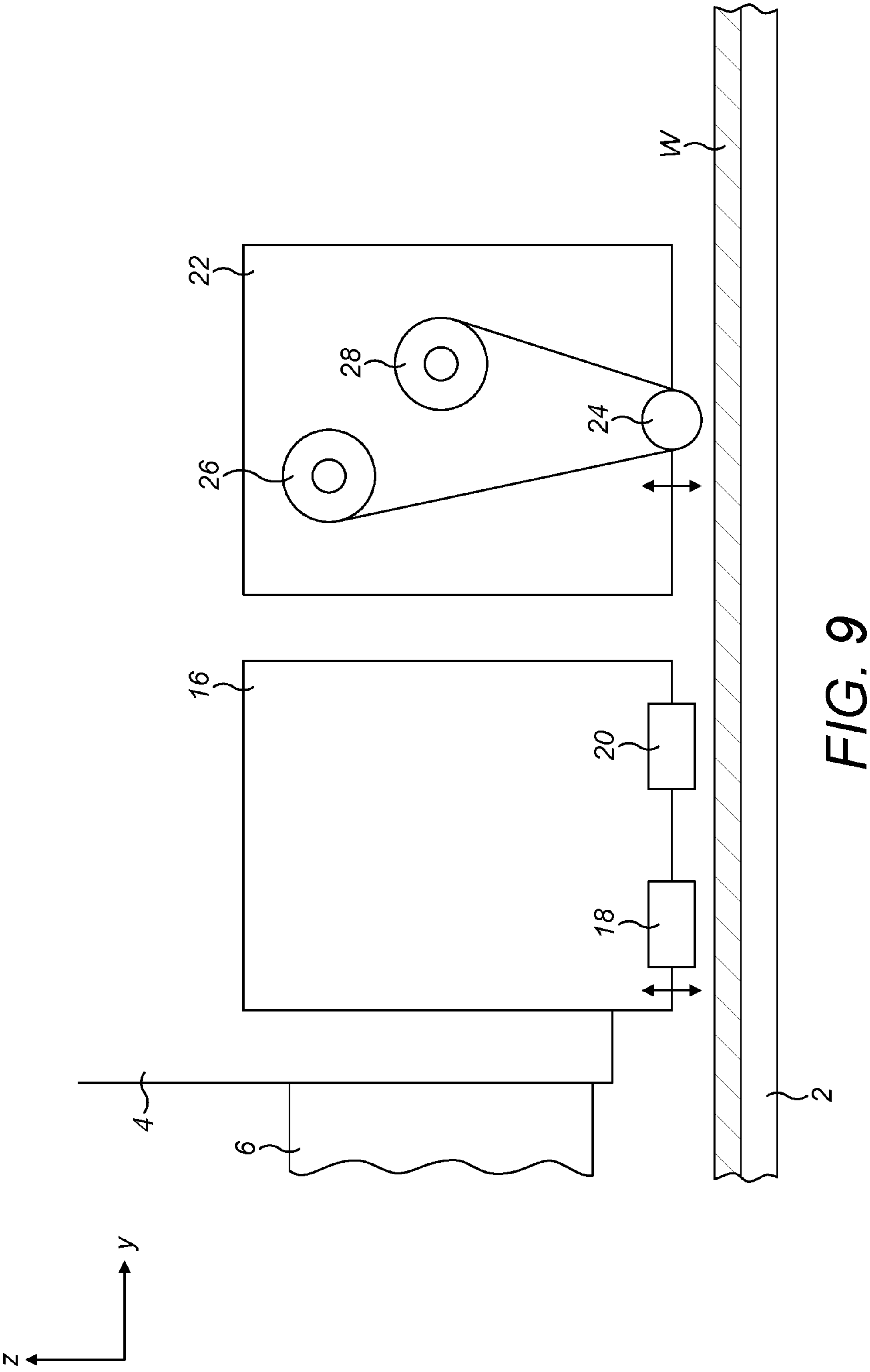
FIG. 9 is a schematic front view of an alternative head unit for the digital flatbed cutter of FIGS. 1 and 2.

FIG. 9 shows part of a different head unit 4 for the digital flatbed cutter 1 that includes a transfer material applicator head 22. The transfer material applicator head 22 is mounted to the head unit 4 next to the printer head 16.

The transfer material applicator head 22 includes an applicator roller 24 with a longitudinal axis that is aligned with the x-axis direction. The applicator roller 24 can be moved along the axis that is normal to the plane (i.e., along the z-axis direction). The applicator roller 24 can be moved by an actuator between a first position-shown in FIG. 9—where it is spaced apart from the workpiece W and a second position—shown in FIG. 10—where it brings the transfer material into contact with the applied ink or coating material.

Transfer material (or "foil") is supplied to the applicator head 24 from a roll 26. As shown more clearly in FIG. 10, the transfer material TM is releasable adhered to a backing material BM. Waste material is collected on a waste roll 28.

Figure 10:
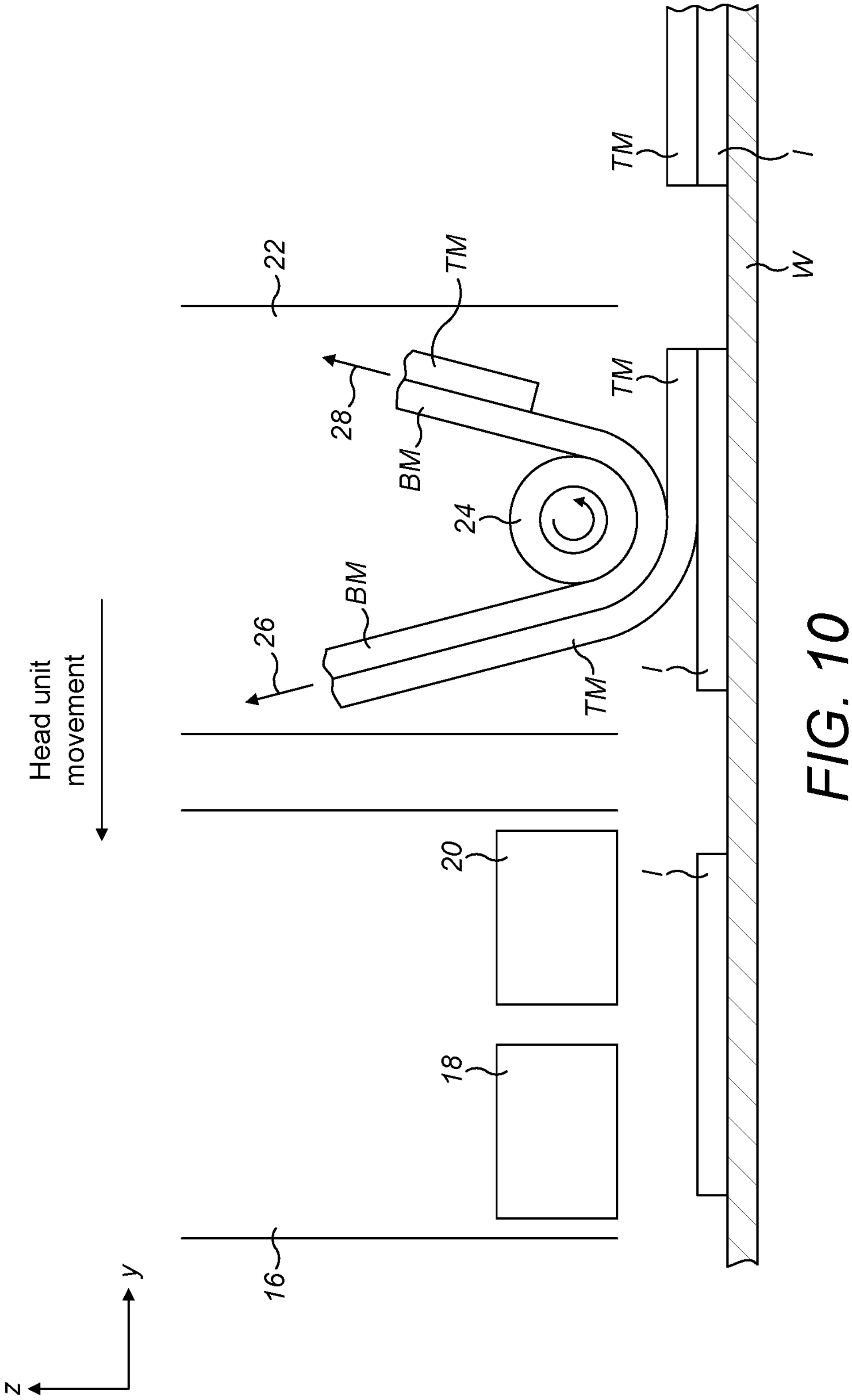
FIG. 10 is a schematic representation of a process of overprinting and applying transfer material to a workpiece.

FIG. 10 shows an example of a process of applying transfer material to the workpiece W. The arrow indicates the direction of movement of the head unit 4 relative to the stationary workpiece W—i.e., from right to left along the y-axis direction. (Alternatively, the head unit can be moved along the x-axis direction and the longitudinal axis of the applicator roller 24 can be aligned with the y-axis direction.) UV-curable ink or coating material I is only applied to the workpiece W by the printhead 18 when the head unit 4 is moving in this particular direction and the UV exposure unit 20 is therefore positioned on the trailing side of the printhead 18 so that the ink or coating material is exposed to the UV light after it has been applied to the workpiece W. The applied UV-curable ink or coating material I is only partially cured by the UV exposure unit 20 so that it remains slightly tacky. The UV-curable ink or coating material I may be transparent or non-transparent and may optionally be applied from a separate printhead (not shown) of the printer head 16.

The transfer material applicator head 22 is positioned on the trailing side of the printer head 16. In FIG. 10, the applicator roller 24 is shown in the second position where it is adhering transfer material TM from the roll 26 to the ink or coating material I. The adhered transfer material TM is shown on the trailing side of the applicator roller 24. Backing material BM from the roll 26 together with any non-adhered transfer material TM is gathered on the waste roll 28. Transfer material TM is only adhered to the tacky ink or coating material I to form a pattern of applied transfer material that matches the pattern of the applied ink or coating material. The workpiece W can be overprinted and coated with transfer material to form the desired finish in a series of passes. When transfer material is not being applied, the applicator roller 24 can be raised to the first position.

The invention claimed is:

1. A digital flatbed cutter comprising:

a flatbed on which a printed workpiece can be positioned;

a head unit that is movable laterally along an x-axis direction and a perpendicular y-axis direction in a parallel plane above the flatbed;

a cutter head mounted to the head unit and including a knife or blade configured to cut the workpiece, the knife or blade being movable along a z-axis direction that is normal to the plane and perpendicular to the x- and y-axes;

a printer head mounted to the head unit and including at least one printhead configured to apply a UV-curable ink or coating material to the workpiece;

a control unit configured to control the movement of the head unit using a digital file with cutting information which specifies where the workpiece should be cut by the knife or blade of the cutter head, and overprinting information which specifies where the workpiece should be overprinted with UV-curable ink or coating material by the printhead of the printer head;

wherein the printer head further comprises a UV exposure unit configured to expose the applied UV-curable ink or coating material to UV light to cure it, wherein the UV exposure unit is adjustable and configured to vary or control the intensity of the UV light to control the curing of the applied UV-curable ink or coating material; and a transfer material applicator head mounted to the head unit, including an applicator roller configured to apply transfer material to the workpiece on top of the applied UV-curable ink or coating material that is only partially cured before the transfer material is adhered to it.

2. The digital flatbed cutter of claim 1, wherein each printhead is an inkjet-type printhead.

3. The digital flatbed cutter of claim 1, wherein each printhead is configured to apply a transparent UV-curable ink or coating material to the workpiece.

4. The digital flatbed cutter of claim 1, wherein each printhead is configured to apply a non-transparent UV-curable ink or coating material to the workpiece.

5. The digital flatbed cutter of claim 1, wherein the printer head comprises a first printhead configured to apply a transparent UV-curable ink or coating material to the workpiece and a second printhead configured to apply a non-transparent UV-curable ink or coating material to the workpiece.

6. The digital flatbed cutter of claim 1, wherein the UV exposure unit is positioned adjacent the at least one printhead.

7. The digital flatbed cutter of claim 1, wherein each printhead is movable along the z-axis direction.

8. The digital flatbed cutter of claim 1, wherein the applicator roller of the transfer material applicator head is movable along the z-axis direction.

9. The digital flatbed cutter of claim 1, wherein the flatbed is a conveyor belt configured to move the workpiece along the x-axis direction.

10. The digital flatbed cutter of claim 1, further comprising a creaser head mounted to the head unit and including a creaser wheel configured to crease the workpiece, the creaser wheel being movable along the z-axis direction.

11. The digital flatbed cutter of claim 1, further comprising a tape applicator head mounted to the head unit, wherein the tape applicator head includes an applicator roller configured to apply a strip of tape to the workpiece.

12. A method of using a digital flatbed cutter, the digital flatbed cutter comprising:

a flatbed;

a head unit that is movable laterally along an x-axis direction and a perpendicular y-axis direction in a parallel plane above the flatbed;

a cutter head mounted to the head unit and including a knife or blade configured to cut the workpiece, the knife or blade being movable along a z-axis direction that is normal to the plane and perpendicular to the x- and y-axes;

a printer head mounted to the head unit and including:

at least one printhead configured to apply a UV-curable ink or coating material to the workpiece, and a UV exposure unit configured to expose the applied UV-curable ink or coating material to UV light to cure it; and a transfer material applicator head mounted to the head unit;

the method comprising:

positioning a printed workpiece on the flatbed;

overprinting the printed workpiece with UV-curable ink or coating material;

partially curing the applied UV-curable ink or coating material;

using the transfer material applicator head to adhere transfer material to the partially cured applied UV-curable ink or coating material to define a matching pattern of transfer material; and cutting the workpiece.

13. The method of claim 12, wherein the UV exposure unit varies the intensity of the UV light to control the curing of the applied UV-curable ink or coating material.

* * * * *